United States Patent [19]

Sakou et al.

[11] Patent Number: 5,259,038
[45] Date of Patent: Nov. 2, 1993

[54] POINT PATTERN MATCHING METHOD AND SYSTEM AS WELL AS PICTURE RECOGNIZING METHOD AND SYSTEM USING THE SAME

[75] Inventors: Hiroshi Sakou, Shiki, Japan; Darrin R. Uecker, Goleta, Calif.

[73] Assignee: Hatachi, Ltd., Tokyo, Japan

[21] Appl. No.: 595,099

[22] Filed: Oct. 10, 1990

[30] Foreign Application Priority Data

Oct. 13, 1989 [JP] Japan .................................. 1-264916

[51] Int. Cl.⁵ .............................................. G06K 9/62
[52] U.S. Cl. ...................................... 382/14; 382/23; 382/30; 382/17
[58] Field of Search ...................... 382/14, 15, 16, 45, 382/46, 23, 30, 35

[56] References Cited

U.S. PATENT DOCUMENTS

| | | | |
|---|---|---|---|
| 3,638,188 | 1/1972 | Pincoffs et al. | 382/14 |
| 4,177,448 | 12/1979 | Brayton | 382/14 |
| 4,334,241 | 6/1982 | Kashioka et al. | 382/45 |
| 4,660,166 | 4/1987 | Hopfield | 364/807 |
| 4,774,677 | 9/1988 | Buckley | 382/15 |
| 4,954,963 | 9/1990 | Penz et al. | 382/15 |
| 4,982,439 | 1/1991 | Castelaz | 382/18 |
| 5,014,219 | 5/1991 | White | 382/16 |
| 5,091,965 | 2/1992 | Kobayashi et al. | 382/15 |
| 5,093,803 | 3/1992 | Howard et al. | 382/14 |

FOREIGN PATENT DOCUMENTS 63-40802 2/1988 Japan .

OTHER PUBLICATIONS

Wei Li, et al., "Object Recognition Based on Graph Matching Implemented by a Hopfield-Style Neural Network," International Joint Conference on Neural Networks, Jun. 19-22, 1989, pp. II-287-II-290.

B. Parvin, et al., "A Constraint Satisfaction Network for Matching 3D Objects," International Joint Conference on Neural Networks, Jun. 19-22, 1989, pp. II-28-1-II-286.

A. Rosenfeld and A. Kak, Digital Picture Processing, Chapter 9 "Digital Geometry, Boundary Tracing", translated by M. Nagao and published from Kindai Kagakusha, pp. 352-361. (Provided in Japanese-English translation unavailable).

Shinji Umeyama, "Recognition of Overlapping Objects Using Point Pattern Matching Algorithm", D-567 in the Spring Meeting of the Institute of Electronic Information and Communication Engineers of Japan (1989). (English Translation Unavailable).

"Basic Theory of Neuro-Computing", published from Nippon Industrial Technology Foundation, Neuro-Computer Search Group, 4th Meeting. (English Translation Unavailable).

Hong, Jiawei and Tan, Xiaonan, "A New Approach to Point Pattern Matching", IEEE, 9th ICPR vol. 1, 1988, pp. 82-84.

*Primary Examiner*—Michael T. Razavi
*Assistant Examiner*—Steven P. Klocinski
*Attorney, Agent, or Firm*—Fay, Sharpe, Beall, Fagan, Minnich & McKee

[57] ABSTRACT

A point pattern matching method and system for use in an object recognizing system for deciding pair combinations between a first group of n points $\bar{x}_j$ (n: integer of 2 or more) (j: integer between 1 and n) in a K-dimensional space (K: integer of 2 or more) and a second group of n second points $\bar{x}_i$ (i: integer between 1 and n) in the same space as the K-dimensional space. A total of $n^2$ of neurons are provided one for each one of point pair combinations between the first group of points and the second group of points, and, when an output of each of the neurons has a value of substantially "1", it is determined that the point pair combination associated with the neuron is matched, whereas, when the output of the neuron has a value of substantially "0", it is determined that the point pair combination associated with the neuron is not matched.

21 Claims, 8 Drawing Sheets

POINT PATTERN MATCHING METHOD AND SYSTEM AS WELL AS PICTURE RECOGNIZING METHOD AND SYSTEM USING THE SAME

BACKGROUND OF THE INVENTION

The present invention generally relates to a matching method of enabling optimum correspondence or matching between a plurality of data belonging to two groups and indicative of physical quantities and, more particularly, to a point pattern matching method and system for enabling matching between a plurality of characteristic point coordinates obtained from an object in an image picture and a plurality of predetermined model characteristic point coordinates to realize automatic recognition of the object, and also to a picture recognition method and system using the former method and system.

In the automation of a manufacturing factory, pattern recognition techniques are very important. There have been so far developed many apparatuses which position products or parts and inspect visual patterns of products based on these techniques. These techniques, are intended to realize a simple and high-speed recognition function, based on making the most use of the same shape of products or parts and the invariable ambient atmosphere such as illumination. For example, for the purpose of positioning chips in the course of assembling (wire-bonding) a semiconductor device, a template pattern corresponding to the shape of an electrode pad of the semiconductor device is previously registered and pattern matching is carried out between the obtained image of the semiconductor device and the previously registered template pattern to detect the position of the electrode pad. In this method, however, in the event where different shapes of electrodes of different sorts of chips are employed, it becomes impossible to recognize the electrodes of the chips, so long as the template is not modified. In this way, the prior art recognition method lacks somewhat in flexibility. To overcome it, a model driven image understanding technique has been lately studied for more flexible recognition. The model driven image understanding technique is featured, in short, by previously giving a computer general knowledge on the shape of an object and the spatial relationship between the object and the imaging device, etc. and in carrying out the picture processing, by providing feedback based on comparison and matching between the processing result and the knowledge. Such a technique enables suitable picture processing of even an object different in attitude.

However, this picture understanding technique has a significant matching drawback, which occurs between a group of characteristic points $q_i$ (i: integer between 1 and n) of a model previously stored as knowledge and a group of characteristic points $p_i$ (i: integer between 1 and n) of an object picture obtained from the picture processing. This matching is very important in determining the presence or absence of an object in a picture or the attitude of the object. These characteristic points usually include the characteristic positions of a contour of R object, such as points on the contour line having maximum, minimum and zero curvatures.

When a person conducts matching between a model and its image picture in an example shown in FIG. 11A, the following procedure is carried out. That is, he compares a spatial distribution (which a person usually has as general shape recognition knowledge to an object) of a group of model characteristic points (marked by ◯ in the drawing) with a spatial distribution of a group of characteristic points (marked by     in the drawing) of the input picture, gives suitable matching between the model characteristic points and the input picture characteristic points, and thereby recognizes every part of the object.

Meanwhile, even when the above matching is realized under the control of a computer, there occurs a rotation between the characteristic points of the model and input picture due to different attitudes or a size difference therebetween due to different distances to the object, which requires such a mechanism as to comparing the general spatial distribution of the input picture characteristic points with that of the model characteristic points. That is, since a series of coordinates of a group of characteristic points of the object input picture obtained through picture processing mean merely positional data ordered at random to the computer, it is necessary to decide matching between a certain coordinate of one of the input picture characteristic points and a corresponding one of the coordinates of the model characteristic points while estimating matching between the other coordinates. The simplest method is to mechanically provide matching between the respective characteristic points of the input picture and all the model characteristic points, to compute errors (which will be referred to as the matching errors, hereinafter) in all pair combinations between the input-picture and model characteristic points, and to select, as a correct combination, one of all the pair combinations between the model characteristic points and the input picture characteristic points which provides the minimum error. However, this method requires (n! combinations for n characteristic points), that a large number of matching combinations be obtained. This in turn requires extended computation time to obtain a solution even if a computer is used. This reason will be explained more in detail. For example, n of the characteristic points are 1, 2, 3, 4, 5, 6, 7, 8, 9, 10, 11, 12, ... A number n! of combinations for each characteristic point are 1, 2, 6, 24, 120, 720, 5040, 40320, 362880, 3628800, 99168000, 4790020000, ... As a result, the total processing time requires n! times of one matching error computation time. Even when one matching error computation time is 1 ms and the number of characteristic points is at most 12 for example, the processing time for all the combinations amounts to 479002000 ms=1331 hours. For this reason, in this sort of prior art matching problem, it has been assumed that optimum matching has the matching error which is lower than a predetermined value, so that, when the matching error exceeds the predetermined value in the matching process, the number of matching times is decreased by aborting the matching operation at that moment. This prior art is discussed in a paper entitled "RECOGNITION OF OVERLAPPING OBJECTS USING POINT PATTERN MATCHING ALGORITHM", D-567 in the Spring national conference of the Institute of Electronical Information and Communication Engineers of Japan (1989).

SUMMARY OF THE INVENTION

When it is desired to obtain optimum one of all combinations regardless of the magnitude of matching errors, such a prior art method as mentioned above cannot cope with it. This is because, even when a certain allowable matching error is set. there is a possibility that the optimum matching error itself exceeds the allowable matching error, depending on the shape of an input object to be recognized. In addition, there sometimes occurs such a situation that it is impossible to estimate the allowable matching error.

It is an object of the present invention to provide a point pattern matching method and system for enabling acquisition of the optimum matching combination while eliminating the need for computing n! of all matching errors, and also to provide a picture recognition method and system using the former method and system.

Another object of the present invention is to provide a point pattern matching method and system for enabling matching between a group of characteristic points obtained from a picture and a group of predetermined model characteristic points for automatic recognition of an object, and also to provide a picture recognition method and system using the former method and system.

In accordance with the present invention, in order to attain these objects, there are provided a point pattern matching method and system for deciding pair combinations between a first group of n points $\bar{x}_j$ (n: integer of 2 or more) (j: integer between 1 and n) in a K-dimensional space (K: integer of 2 or more) and a second group of n second points $\bar{x}_i$ (i: integer between 1 and n) in the same space as the K-dimensional space. A neural network having a total of $n^2$ of neurons is provided one for each one of point pair combinations between the first group of points and the second group of points to determine, on the basis of an output of each of the neurons, the point pair combination associated with the neuron. That is, a first threshold value substantially close to 1 and a second threshold value substantially close to 0 are prepared. Output values of the neurons indicative of matching degrees in point pair combinations are obtained. When a judgment is made that the output value of the neuron exceeds the first threshold value, the point pair combination associated with the neuron is matched, and when a judgment is made that the output value of the neuron is below the second threshold value, the point pair combination associated with the neuron is not matched.

In accordance with the present invention, the above objects are attained by using such a neural network as having the following features and preferably a Hopfield-type neural network. Two point groups, that is, a group of model characteristic points $x_i$ (i: integer between 1 and n) and a group of characteristic points $\bar{x}_j$ (j: integer between 1 and n) on the boundary line of an object, are considered. Then a single neuron $N_{ij}$ is provided for each one of point pair combinations between the model characteristic points $q_i$ and the input characteristic points $\bar{x}_j$ so as to output a degree of correspondence between associated point pairs. When an output $V_{ij}$ of the neuron $N_{ij}$ having a value from 0 to 1 is substantially 0, the characteristic point $\bar{x}_i$ is not matched with the characteristic point $\bar{x}_j$, whereas, when the output of the neuron is substantially 1, characteristic point $\bar{x}_i$ is matched with the characteristic point $\bar{x}_j$. In this case, the overall energy E of the neural network is set to be a sum of a constraint energy $E_1$ and a cost energy $E_2$. The constraint energy $E_1$ is defined, as follows, as having a minimum when the model characteristic points $\bar{x}_i$ are matched with the input characteristic points $\bar{x}_i$ in 1:1 relation.

$$E_1 = K_1 \left( \sum_i \sum_j \sum_{k \neq j} V_{ij} V_{ik} + \sum_i \sum_j \sum_{k \neq i} V_{ij} V_{kj} \right) + K_2 \left( \sum_i \sum_j V_{ij}/n - m \right)$$

The cost energy $E_2$, on the other hand, is defined, as follows, as providing the minimum matching error in a least squares sense at the optimum matching, when the group of input characteristic points $\bar{x}_j = (X_j, Y_j)$ is considered to correspond to a linear transformation (for example, affine transformation (parallel movement, rotation)) and minute variation of the group of model characteristic points $\bar{x}_i = (x_i, y_i)$.

$$E_2 = K_3 \sum_i \sum_j V_{ij}^2 [\{X_j - (ax_i + by_i + c)\}^2 + \{Y_j - (Ax_i + By_i + C)\}^2]$$

where transformation coefficients a, b, c, A, B and C satisfy the following matrix equations, $K_1$, $K_2$, $K_3$ and m are positive constants suitably determined.

$$\begin{pmatrix} \sum_i x_i^2 & \sum_i x_i y_i & \sum_i x_i \\ \sum_i y_i x_i & \sum_i y_i^2 & \sum_i y_i \\ \sum_i x_i & \sum_i y_i & \sum_i 1 \end{pmatrix} \begin{pmatrix} a \\ b \\ c \end{pmatrix} = \begin{pmatrix} \sum_i \sum_j V_{ij} X_j x_i \\ \sum_i \sum_j V_{ij} X_j y_i \\ \sum_i \sum_j V_{ij} X_j \end{pmatrix}$$

$$\begin{pmatrix} \sum_i x_i^2 & \sum_i x_i y_i & \sum_i x_i \\ \sum_i y_i x_i & \sum_i y_i^2 & \sum_i y_i \\ \sum_i x_i & \sum_i y_i & \sum_i 1 \end{pmatrix} \begin{pmatrix} A \\ B \\ C \end{pmatrix} = \begin{pmatrix} \sum_i \sum_j V_{ij} Y_j x_i \\ \sum_i \sum_j V_{ij} Y_j y_i \\ \sum_i \sum_j V_{ij} Y_j \end{pmatrix}$$

The second energy $E_2$ forms one of the features of the present invention.

When the energy E of the network is defined as mentioned above and such a $V_{ij}$ pair as providing the minimum energy E, i.e., providing both the minimum $E_1$ and the minimum $E_2$ is found, the found pair is the optimum pair solution.

In order to obtain such $V_{ij}$ as providing the minimum E, the output $V_{ij}$ of the neuron $N_{ij}$ is now regarded as a function with respect to time t. Then obtaining such $V_{ij}$ is replaced by solving the following dynamics.

$$du_{ij}/dt = -\partial E/\partial V_{ij}$$

where $u_{ij}$ is an input to a neuron and $V_{ij}$ is given as follows.

$$V_{ij} = 1/(1 + \exp\{-u_{ij}\})$$
$$E = E_1 + E_2$$

The energy E of the above dynamics decreases with time, which can be mathematically proved. Accordingly, the dynamics is solved using the Euler-Cauchy method under the proper initial conditions and the $V_{ij}$ pair at the time of reaching its equilibrium point is considered as a solution. That is, differentials of the above equation yields the following equation. Namely, to use the Euler-Cauchy method, the following equation is made by the above equations $$V_{ij}(t+\Delta t) = V_{ij}(t) - \Delta t \cdot V_{ij}(t)(1 - V_{ij}(t)) \cdot \partial E / \partial V_{ij}$$

And convergence values for the $V_{ij}$ are calculated through numerical computation. By finding i and j when the convergence value of the $V_{ij}$ is 1, matching between the characteristic points can be determined. It has been found from our experiments that the number of iterations necessary for matching between the characteristic points, i.e., the number of t updating times is proportional to the number n of characteristic points. This is considered due to the effect of parallel computation of the present neural network.

In accordance with the present invention, in this way, the optimum matching can be obtained through computation proportional in amount to n while eliminating the need for performing computation of matching errors over n! combinations in matching between n characteristic points. As a result, there can be realized high-speed matching between a group of characteristic points obtained from a picture and a group of predetermined model characteristic points for automatic object recognition.

The above pattern matching system can be applied as an object recognition system for recognizing a part of an object in an image picture through picture processing. The object recognition system comprises a first unit for extracting a first group of characteristic points $\bar{x}_i$ (i: integer between 1 and n) from the object in the picture, a second unit for previously storing a second group of characteristic points $\bar{x}_j$ (j: integer between 1 and n) of a model corresponding to the object and attribute data for the second group of characteristic points, a neural network having a plurality of neurons each provided for each one of point pair combinations between the first group of characteristic points and the second group of characteristic points, a third unit for reading out an output value of each neuron and determining that, when the output value of the neuron is substantially "1", the point pair combination associated with the neuron is matched, and a fourth unit for reading out from the second unit one of the attribute data of the second group of characteristic points corresponding to the point pair combination determined as matched by the third unit, whereby the position of the part of the object can be recognized and the attribute data about the part is obtained.

DESCRIPTION OF THE PREFERRED EMBODIMENTS

Embodiments of the present invention will be explained in detail with reference to the attached drawings. Explanation will be made as to an example wherein a point pattern matching method and system are applied to a picture recognition system, in particular, to such a picture recognition system that automatically selects products in a manufacturing factories or the like to realize automation of object recognition. A factory production line includes such a step of selecting, as necessary, products of the same sort but somewhat different in shape being carried and transported on a belt conveyer or the like transportation mechanism. When a robot hand, as an example, is employed as the selection mechanism, it becomes necessary for the robot hand to recognize and grasp that predetermined specific site of the selected product which causes no strength problem when subjected to the grasp by the robot hand. Meanwhile, products being carried on the transportation mechanism are somewhat different in the attitude supported thereon and shape itself. Accordingly, there is demanded such an intelligent object recognition system that has a recognition function of being able to recognize a specific site of a product accurately even under the aforementioned conditions.

Figure 1:
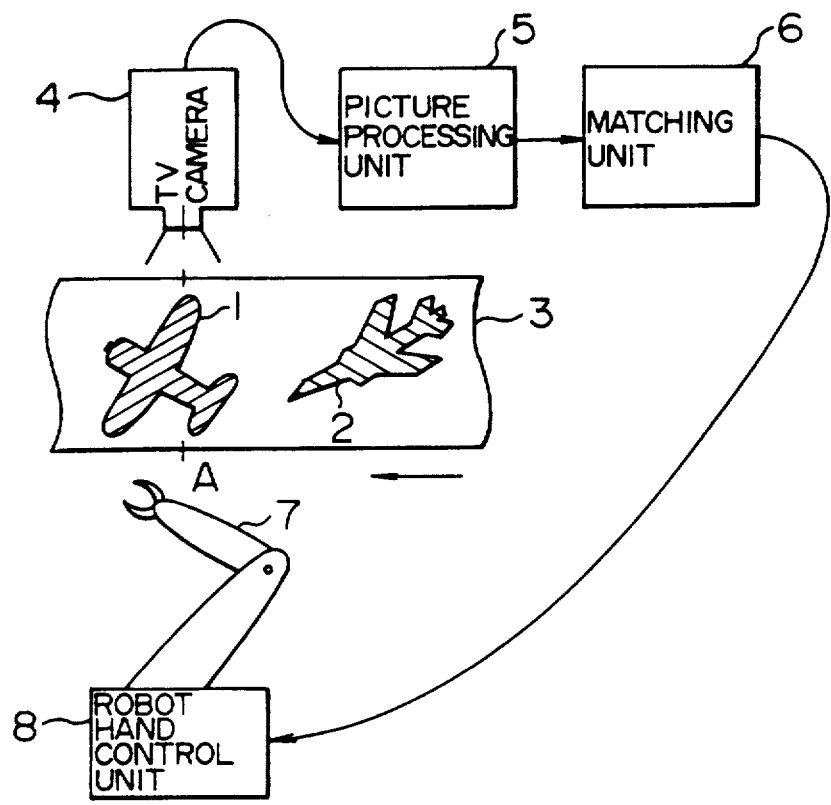
FIG. 1 shows a general arrangement of an object recognizing system in accordance with the present invention.

FIG. 1 shows an overall arrangement of an object recognition system to which the present invention is applied. The arrangement of the object recognition system enables realization of the aforementioned intelligent recognition, which will be detailed below.

Explanation will first be made as to the schematic processing procedure of the system. Products 1, 2, . . . (toy airplanes 1 and 2, in the illustrated example) somewhat different in shape are carried on a transportation mechanism 3 while also different in the attitude supported thereon. When each product arrives at a specific position A, the product feeding operation is temporarily stopped and a stationary picture image of the corresponding product is detected by a TV camera 4 and then sent therefrom to a picture processing unit 5. The picture image processing unit 5 extracts a set or group of coordinates of characteristic points (characteristic point coordinate group) indicative of the contour (projected and recessed configurations) of the product from the data of the product picture image, and sends the extracted data to a matching unit 6. The matching unit 6 collates the group of coordinates of characteristic points with a group of coordinates of model characteristic points (which will be sometimes referred to as the model characteristic point coordinate group, hereinafter). The model characteristic point coordinate group expresses the contour of a typical product having normal size and attitude. Various sorts of data indicative of the titles of the respective characteristic points or data required for a robot hand 7 to grasp the product, such as general heights, strengths, etc. of the characteristic points are stored in the unit 6. The respective characteristic point coordinates of the input product are naturally different from the model characteristic point coordinates depending on the product type and its attitude. The matching unit 6 compares spatial positions of the model characteristic point coordinates with those of the input characteristic point coordinates and finds optimum combinations between the model characteristic points and the corresponding input characteristic points. And the matching unit 6 also finds pre-designated ones of the model characteristic points having "title" to be grasped by the robot hand 7 and sends to a robot hand control unit 8 ones of the input characteristic point coordinates corresponding to the title model characteristic points and various data associated therewith. The robot hand control unit 8 computes three-dimensional coordinates of "title" of the product to be grasped by the robot hand on the basis of these input data and relative positional relations to the TV camera 4, transportation mechanism 3 and robot hand 7, and instructs the robot hand 7 to grasp the title site and move the product to a predetermined location. Thereafter, the transportation mechanism is again driven for the selection of the next product.

One of the features of the present object recognition system is that general knowledge of products belonging to an identical type is previously stored in a memory in the form of model characteristic point coordinates and data associated therewith. When it is desired to recognize completely different sorts of products, it is only required to change its knowledge. Next, explanation will be made as to the picture processing unit 5 and the matching unit 6 which form major parts of the present system.

Figure 2:
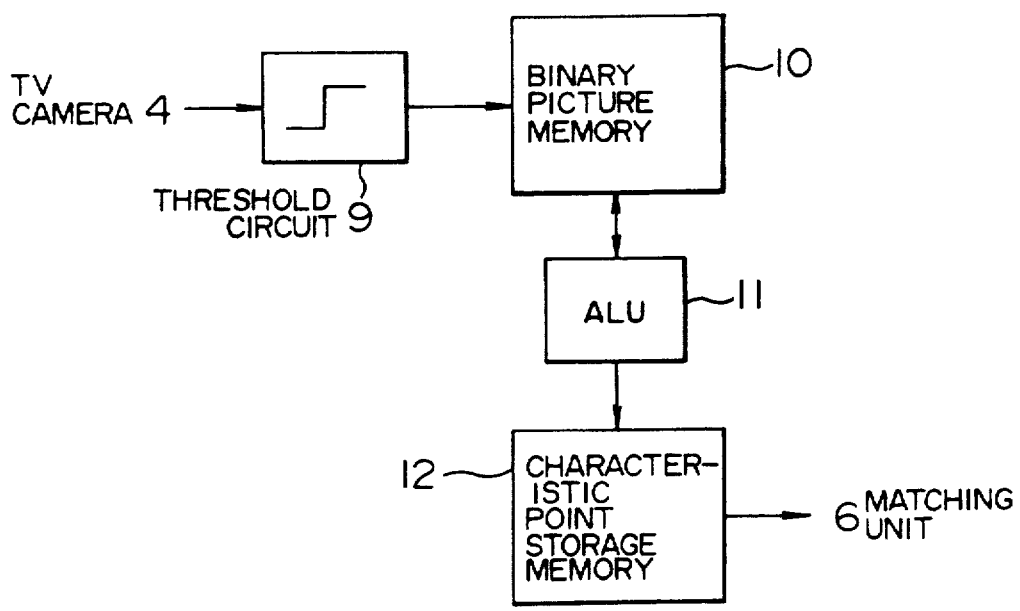
FIG. 2 shows a detailed example of arrangement of a picture processing unit 5 in FIG. 1.

Referring to FIG. 2, there is shown a specific arrangement of the picture processing unit 5, wherein an analog picture signal received from the TV camera 4 is converted at a threshold circuit 9 into a binary digital picture data that is then sent to a binary picture memory 10 to be stored therein. An arithmetic and logic unit (ALU) 11 extracts a contour line of the product from the binary picture data of the binary picture memory 10 and computes characteristic point coordinates corresponding to the projected and recessed features of the contour line. The specific processing procedure carried out at the ALU 11 is shown by a flowchart in FIG. 3.

Figure 3:
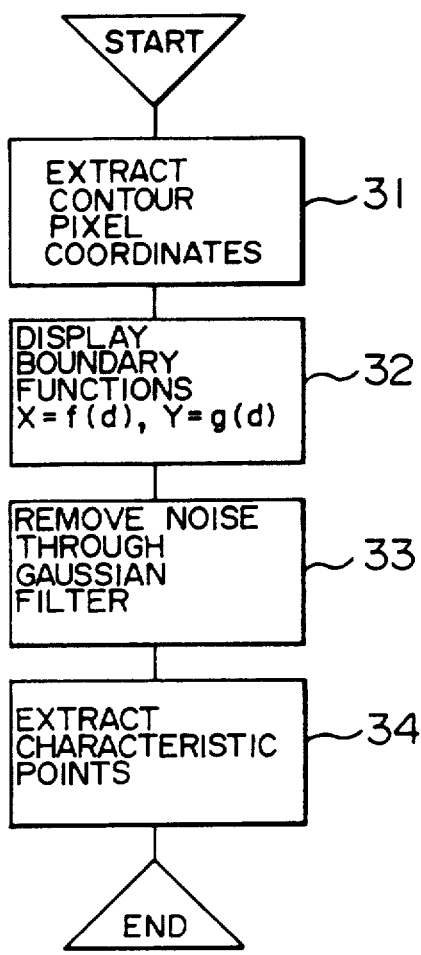
FIG. 3 is a flowchart for explaining a procedure of extracting a characteristic point.
Figure 4:
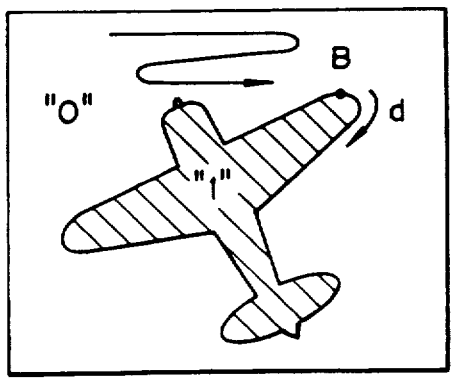
FIG. 4 shows an example of an image picture of an object to be matched.

More specifically, in a step 31 of FIG. 3, coordinates of pixels on the product contour are extracted. It is assumed in the illustrated example that the picture data includes a single group of data all having values "1" corresponding to the product and data all having values "0" corresponding to a part other than the product. The system traces the picture screen from its top to bottom as shown in FIG. 4 to search pixels having values "1" on the screen raster. The first found pixel having a value "1" is set to be a start point B. The system starts its tracing operation starting from the start point B along the boundary of the product picture contour to find a series of coordinates corresponding to the contour boundary pixels. For details of the tracing method, refer to a reference book titled "DIGITAL PICTURE PROCESSING", Chapter 9 'Digital Geometry', Boundary Tracing, translated by Kakoto Nagao and published from Kindai Kagakusha. In a step 32, the series of boundary coordinates (X, Y) are expressed as follows in the form of functions with respect to distance d along the boundary line from the start point B as a boundary tracing parameter.

$$X = f(d) \quad (1)$$

$$Y = g(d) \quad (2)$$

Figure 5:
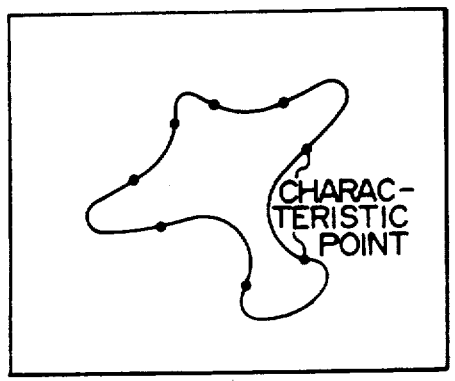
FIG. 5 shows characteristic points obtained from the exemplary picture of FIG. 4.

In a step 33, these functions (1) and (2) are subjected to a Gaussian filter which follows, $$F(d;s) = (1/\sqrt{2}\,\pi s)\int_{-\infty}^{\infty} f(u)\exp\{-(d-u)^2/2s^2\}du \quad (3)$$

$$G(d;s) = (1/\sqrt{2}\,\pi s)\int_{-\infty}^{\infty} g(u)\exp\{-(d-u)^2/2s^2\}du \quad (4)$$

where s denotes a standard deviation of the Gaussian filter. Through such filtering execution, minute noisy parts of the contour boundary can be eliminated from the original boundary and a boundary consisting of only a general configuration can be obtained. The boundary line thus obtained is shown in FIG. 5. In a step 34, characteristic points $\bar{x}_j$ (j: integer between 1 and n) of the contour boundary line which satisfy the following equation (5) are found, $$(F'G'' - F''G')/(F'^2 + G'^2)^{3/2} = 0 \quad (5)$$

where F' and F" denote the first and second differentiation of the function F(d;s) of the equation (3) respectively. The found characteristic points mean geometrically inflection points of the boundary line. A set of coordinates of the characteristic points thus found are stored in a characteristic point storage memory 12 in FIG. 2. It is now assumed that coordinates $(X_j, Y_j)$ of the group of input characteristic points $\bar{x}_j$ and coordinates $(x_i, y_i)$ of the group of model characteristic points $\bar{x}_i$ are normalized as follows for the purpose of preventing matching operation (to be explained later) from being affected by the absolute coordinates,

```
xbar = (1/n)Σx_i'        ybar = (1/n)Σy_i'
x_i'' = x_i' - xbar       y_i'' = y_i' - ybar
xmax = max{x_i''}         ymax = max{y_i''}
xymax = max{xmax, ymax}
xmin = min{x_i''}         ymin = min{y_i''}
xymin = min{xmin, ymin}
x_i = (x_i'')/(xymax - xymin)
y_i = (y_i'')/(xymax - xymin)

Xbar = (1/n)ΣX_i'         Ybar = (1/n)ΣY_i'
X_i'' = X_i' - Xbar       Y_i'' = Y_i' - Ybar
X_i = (X_i'')/(xymax - xymin)
Y_i = (Y_i'')/(xymax - xymin)
``` where xbar and ybar denote averages of all x and y respectively, max{$x_i''$} denotes a maximum of all $x_i''$ and ($X_j'$, $Y_j'$) and ($x_i'$, $y_i'$) denote coordinates of respective inflection points.

Figure 6A:
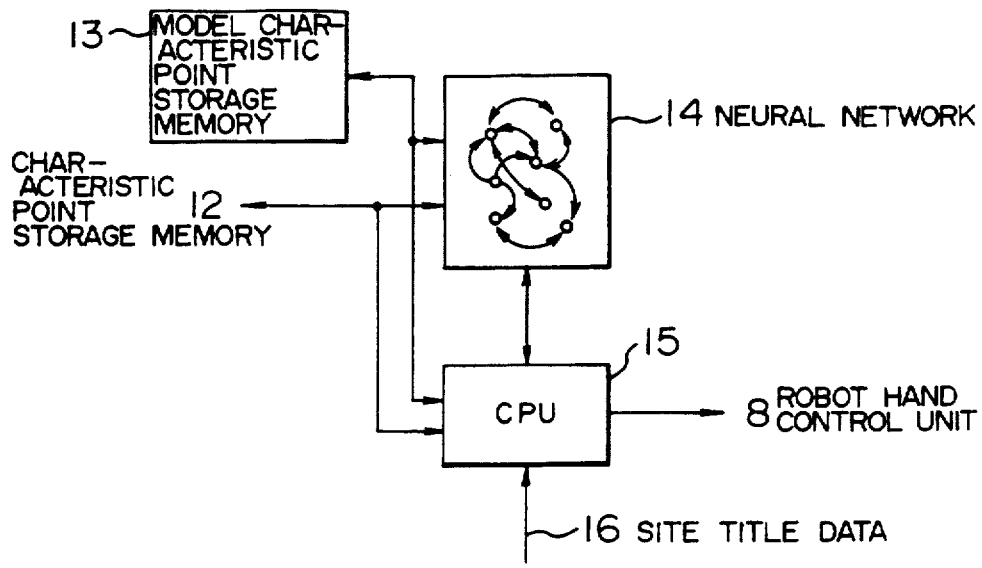
FIG. 6A is a detailed example of arrangement of a matching unit in FIG. 1.
Figure 6B:
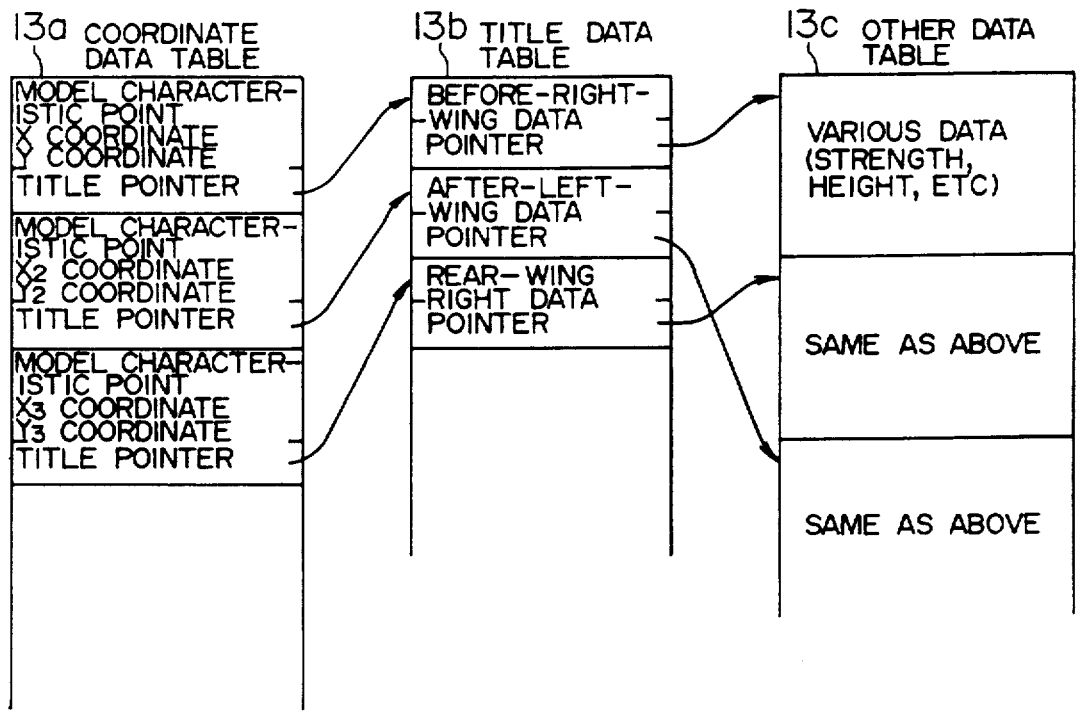
FIG. 6B shows an exemplary structure of tables in a model characteristic point storage memory in FIG. 6A.

Shown in FIG. 6A is an example of detailed arrangement of the matching unit 6. The matching unit 6 is intended to match the group of characteristic point coordinates of the product boundary shape found by the picture processing unit 5 and stored in the characteristic point storage memory 12 with respect to the group of predetermined model characteristic point coordinates to know the meaning of the product characteristic points. To this end, the matching unit 6 comprises a model characteristic point storage memory 13 for storing therein the group of model characteristic point coordinates, a neural network 14 for executing the matching operation, and a control unit (CPU) 15. More in detail, the control unit 15, with use of matching result data between characteristic points obtained by the neural network and a predetermined site title data 16 indicative of a predetermined site for the robot hand to be grasped, selects actual coordinate values of the designated site from the characteristic point storage memory and various data associated with the model characteristic point coordinates with respect to the designated site from the model characteristic point storage memory. These data are sent from the control unit 15 to the robot hand control unit 8. FIG. 6B shows an example of details of a coordinate data table 13a, a title data table 13b and an other data table 13c within the model characteristic point storage memory 13.

Figure 7:
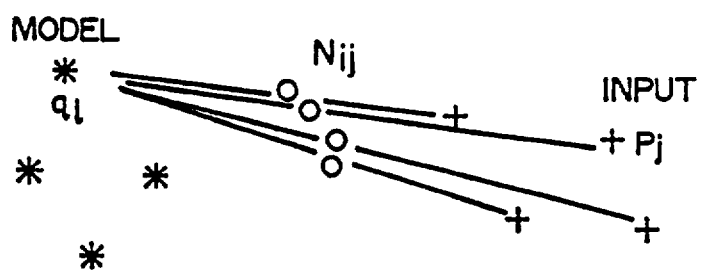
FIG. 7 is a diagram showing how to position characteristic points to be matched and neurons.

Explanation will now be directed to the principle of the neural network 14 performing the main function of the present matching unit and to an exemplary circuit configuration for realizing it. First, how to match the model characteristic points $\bar{x}_i$ (i: integer between 1 and n) with the characteristic points $\bar{x}_j$ (j: integer between 1 and n) of the input boundary line will be explained by referring to FIG. 7. In this matching, it is preferable to use a Hopfield-type neural network. FIG. 7 shows how to position neurons. That is, a neuron $N_{ij}$ is provided for each one of point pair combinations between the model and input characteristic points $\bar{x}_i$ and $\bar{x}_j$ so as to output a degree of correspondence between associated point pairs. Of course, the neuron is not actually made and wired as shown in FIG. 7, as FIG. 7 is merely a conceptual description of the concepts discussed herein. An output $V_{ij}$ of the neuron $N_{ij}$ has a value from 0 to 1. When the output $V_{ij}$ is substantially 0, this is interpreted as "the characteristic point $\bar{x}_i$ is not matched with the characteristic point $\bar{x}_j$", whereas when the output $V_{ij}$ is substantially 1, this is interpreted as "the characteristic point $\bar{x}_i$ is matched with the characteristic point $\bar{x}_j$". In this connection, it is also possible that a first threshold value $V_1$ close to 1 and a second threshold value $V_2$ may be set ($1 \approx V_1 > V_2 \approx 0$) so that, when a relation $V_{ij} \geq V_1$ is satisfied, this is judged to be "matching" therebetween, while, when a relation $V_{ij} \leq V_2$ is satisfied, this is judged to be "no matching" therebetween. In this case, an overall energy E of the neural network corresponds to a linear addition between a constraint energy $E_1$ and a cost energy $E_2$ and in the illustrated example, corresponds to a sum of the constraint and cost energies $E_1$ and $E_2$. The constraint energy $E_1$ is defined as having a minimum value when the mode characteristic point $\bar{x}_i$ is matched with the input characteristic point $\bar{x}_j$ in a 1:1 relation, as follows.

$$E_1 = K_1 \left( \sum_i \sum_j \sum_{k \neq j} V_{ij}V_{ik} - \sum_i \sum_j \sum_{k \neq i} V_{ij}V_{kj} \right) - K_2 \left( \sum_i \sum_j V_{ij}/n - m \right) \tag{6}$$

The cost energy $E_2$ is defined, as follows, as having a minimum matching error (minimum square error) or cost in a least squares sense, at the optimum matching when the group of input characteristic points $\bar{x}_j (= (X_j, Y_j))$ is subjected to a linear transformation, e.g., an affine transformation (parallel movement, rotation) with respect to the group of model characteristic points $q_i$ ($= x_i, y_i$) to be changed by a very small amount, $$E_2 = K_3 \sum_i \sum_j V_{ij}^{n'} [\{X_j - (ax_i + by_i + c)\}^2 + \{Y_j - (Ax_i + By_i + C)\}^2] \tag{7}$$

where n' is an integer which is preferably 1 or 2, transformation coefficients a, b, c, A, B and C satisfy the following equations (8) and (9), and $K_1$, $K_2$, $K_3$ and m are positive constants suitably determined. The second energy is one of the features of the present invention.

$$\begin{pmatrix} \sum_i x_i^2 & \sum_i x_i y_i & \sum_i x_i \\ \sum_i y_i x_i & \sum_i y_i^2 & \sum_i y_i \\ \sum_i x_i & \sum_i y_i & \sum_i 1 \end{pmatrix} \begin{pmatrix} a \\ b \\ c \end{pmatrix} = \begin{pmatrix} \sum_i \sum_j V_{ij} X_j x_i \\ \sum_i \sum_j V_{ij} X_j y_i \\ \sum_i \sum_j V_{ij} X_j \end{pmatrix} \tag{8}$$

$$\begin{pmatrix} \sum_i x_i^2 & \sum_i x_i y_i & \sum_i x_i \\ \sum_i y_i x_i & \sum_i y_i^2 & \sum_i y_i \\ \sum_i x_i & \sum_i y_i & \sum_i 1 \end{pmatrix} \begin{pmatrix} A \\ B \\ C \end{pmatrix} = \begin{pmatrix} \sum_i \sum_j V_{ij} Y_j x_i \\ \sum_i \sum_j V_{ij} Y_j y_i \\ \sum_i \sum_j V_{ij} Y_j \end{pmatrix} \tag{9}$$

When the energy E of the network is defined as mentioned above and a solution for the $V_{ij}$ pair providing the minimum energy E, i.e., both the minimum energy $E_1$ and the minimum energy $E_2$ are found, the solution for the equations (8) and (9) becomes the optimal pair. In the case of the optimal pair solution, since $V_{ij}$ in the equations (8) and (9) has a value of 0 or 1, the solution for the equations (8) and (9) is equivalent to the solution in a known least squares method.

As well known, to get the $V_{ij}$ pair providing the minimum energy E, the output $V_{ij}$ of the neuron $N_{ij}$ is regarded as a function with respect to time t in the Hopfield-type neural network and the following dynamic equation (11) for this network is to be solved, $$du_{ij}/dt = -\partial E/\partial V_{ij}$$

$$V_{ij} = 1/(1 + \exp\{-u_{ij}\}) \tag{11}$$

where, The dE/dt is given as follows.

$$dE/dt = \sum_i \sum_j \partial E/\partial V_{ij} \cdot dV_{ij}/dt$$

Further, the following equation (12) is derived from the equation (11).

$$dV_{ij}/dt = -V_{ij}(1 - V_{ij}) \partial E/\partial V_{ij} \tag{12}$$

Hence, the following relation is obtained.

$$dE/dt = -\sum_i \sum_j V_{ij}(1 - V_{ij}) \cdot (\partial E/\partial V_{ij})^2 \leq 0$$

It will be seen from the above relation that the energy E of the dynamics defined as the equation (11) decreases with time. The dynamics is solved using the known Euler-Cauchy method and the $V_{ij}$ pair when the dynamics reaches its equilibrium point is considered as a solution. In other words, the equation (12) is transformed to the following equation (13) which is suited to numerical computation.

$$V_{ij}(t+\Delta t) = V_{ij}(t) - \Delta t \cdot V_{ij}(t)(1 - V_{ij}(t)) \cdot \partial E/\partial V_{ij} \quad (13)$$

Each convergence value for the $V_{ij}$ is obtained through iterative numerical computation using the above equation.

Figure 8:
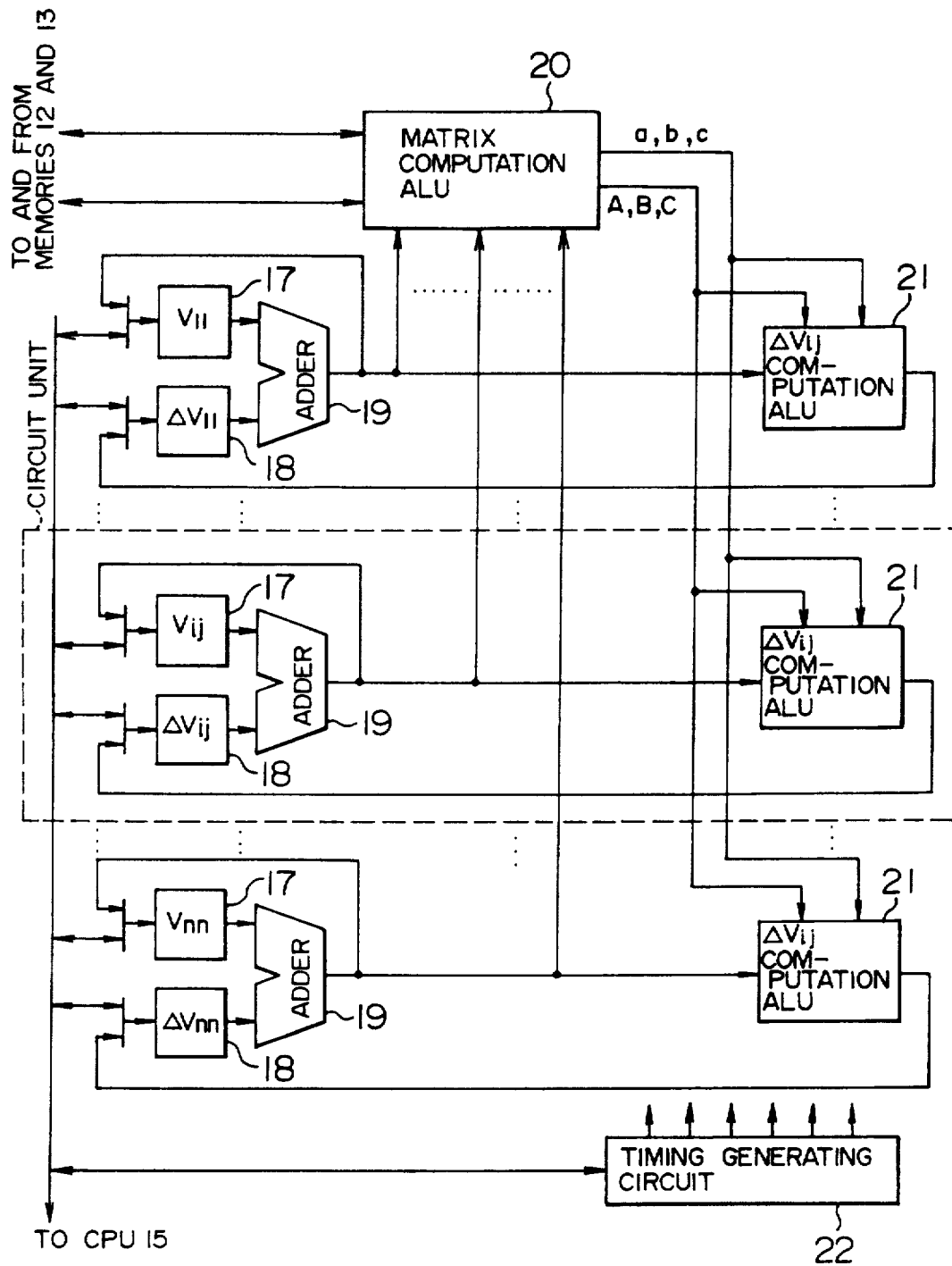
FIG. 8 is an exemplary circuit diagram embodying the iterative computation of a neural network.

FIG. 8 shows an example of a circuit embodying the iterative computation of the neural network. The circuit of FIG. 8 comprises a group of circuit units for computing $n^2$ convergence values for the neuron output $V_{ij}$. In the drawing, a part encircled by a dotted line corresponds to one circuit unit. Explanation will be focused on the exemplary arrangement of the circuit unit. Registers 17 and 18 are used to store therein the value of the neuron output $V_{ij}$ corresponding to the first term in a right side of the equation (13) and the value of a change $\Delta V_{ij} = -\Delta t \cdot V_{ij}(1 - V_{ij}) \cdot \partial E/\partial V_{ij}$ in the neuron output $V_{ij}$ corresponding to the second term in a right side of the equation (13), respectively. As shown by a flowchart in FIG. 9 for explaining the operation of the control unit (CPU) 15 (refer to FIG. 6), the control unit 15 sets the $V_{ij}$ and the initial value of $\Delta V_{ij}$ in the registers 17 and 18 (step 91) and then sets in a computation unit 21 the constants $\Delta t$, $K_1$, $K_2$ and $K_3$ for use in the computation unit 21 prior to the iterative computation (step 92). The values of the neuron output $V_{ij}$ and the change $\Delta V_{ij}$ are added together at an adder 19 to obtain the next $V_{ij}$ corresponding to the left side of the equation (13). The obtained $V_{ij}$ is written again in the register 17 at a predetermined timing. Meanwhile, the values of the $V_{ij}$ computed at the respective circuit units are input first to a computation unit (matrix computation ALU) 20. The computation unit 20, using the input Values of the $V_{ij}$ and the model characteristic point coordinates $(x_i, y_i)$ (i: integer between 1 to n) within the model characteristic point storage memory (13 in FIG. 6A) and the input characteristic point coordinates $(X_j, Y_j)$ (j: integer between 1 and n) within the characteristic point storage memory, executes the matrix computation of the equations (8) and (9) in accordance with a microprogram to find the coefficients a, b, c, A, B and C. Each computation unit (ALU for $\Delta V_{ij}$ computation) 21 in each circuit unit computes $\Delta V_{ij} = -\Delta t \cdot V_{ij}(1 - V_{ij}) \cdot \partial E/\partial V_{ij}$ with respect to the $V_{ij}$ in accordance with the microprogram and writes the computation result again in the register 18. The activation of the computation unit 21 is set when the computation processing of the computation unit 20 is completely terminated, while the writing timing of the next $V_{ij}$ and change $\Delta V_{ij}$ in the registers 17 and 18 is set when the computation processing of the computation unit 21 is completely terminated. These timings are generally controlled by a timing generating circuit 22. The control unit 15 (refer to FIG. 6A) checks whether or not the values of the respective registers 17 of all the circuit units, i.e., all the values of the $V_{ij}$ are converged substantially to 1 or 0 at every iterative computation. That is, the control unit 15 reads out the values of the $V_{ij}$ of the respective registers 17, counts the number CN of such registers 17 as satisfying a relation $V_{ij} \simeq 1$ (step 93), and checks whether to satisfy a relation CN=n (step 94). After the relation CN=n is satisfied, that is, after all the values of the $V_{ij}$ are converged, the control unit finds (i, j) pairs satisfying the relation $V_{ij} \simeq 1$, at which stage matching between characteristic points is completed (step 95). Thereafter, the CPU 15 sends to the robot hand control unit 8 (refer to FIG. 1) the input characteristic point coordinates $\bar{x}_j$ of the characteristic point storage memory associated with the model characteristic point coordinate $\bar{x}_i$ of the model characteristic point storage memory 13 (refer to FIG. 6A) having the predetermined site title data 16 (refer to FIG. 6A) indicative of the grasping site of the robot hand and also various sorts of data associated with the model characteristic point coordinates. Although the foregoing explanation has been made in connection with an example herein the iterative computation is carried out once for the predetermined initial value of the $\Delta V_{ij}$ to realize matching, the iterative computation may be carried out several times with the changed initial values of the $\Delta V_{ij}$ and matching providing the minimum one of the values $E_2$ (equation (7)) at the convergence may be employed as a correct solution.

Explanation will next be made as to another example of circuit configuration of the neural network 14. This circuit is an analog circuit a general arrangement of which is disclosed in a reference book titled "BASIC THEORY OF NEURO-COMPUTING", published from Nippon Industrial Technology Foundation, Neuro-computer search group, 4-th meeting and so on. This reference states that, when the energy E of a network is of a multiple first-order polynomial with respect to the output $V_{ij}$ of neuron, a neural network can be made up of an analog neuro-network circuit. However, it is necessary to optimumly set the values of resistors and currents associated with the weight coefficients between neurons which are most important in the characteristics of the circuit. Explanation will be focused on how to set the optimum neuron weight coefficient which is most suitable for the object of the present invention.

The present invention is featured, in particular, in that the neuron weight coefficient is modified for every group of input characteristic point coordinates of a product to be recognized with respect to the model characteristic point coordinates.

In the case of the analog neural network circuit, the dynamics of the network is defined as follows, as in the equation (11).

$$du_{ij}/dt = -\partial E/\partial V_{ij}$$

$$V_{ij} = \sigma(u_{ij}) = 1/(1 + \exp\{-u_{ij}\}) \quad (14)$$

$$E = E_1 + E_2$$

And assume that the overall energy E is expressed in the form of a multiple first-order polynomial, as follows $$E = (1/2) \sum_i \sum_j \sum_k \sum_l W_{ijkl} V_{ij} V_{kl} - \quad (15)$$

$$\sum_i \sum_j v_{ij} V_{ij} - (1/\tau) \sum_i \sum_j \int_0^{v_{ij}} \sigma^{-1}(v) dv$$

where $\tau$ is a positive constant and the following relations are satisfied.

$W_{ijij}=0$, $W_{ijkl}=W_{klij}$

Since a relation $dE/dt \leq 0$ can be proved as in the foregoing explanation, a solution providing the minimum energy E can be obtained by solving the equation (14).

Figure 10:
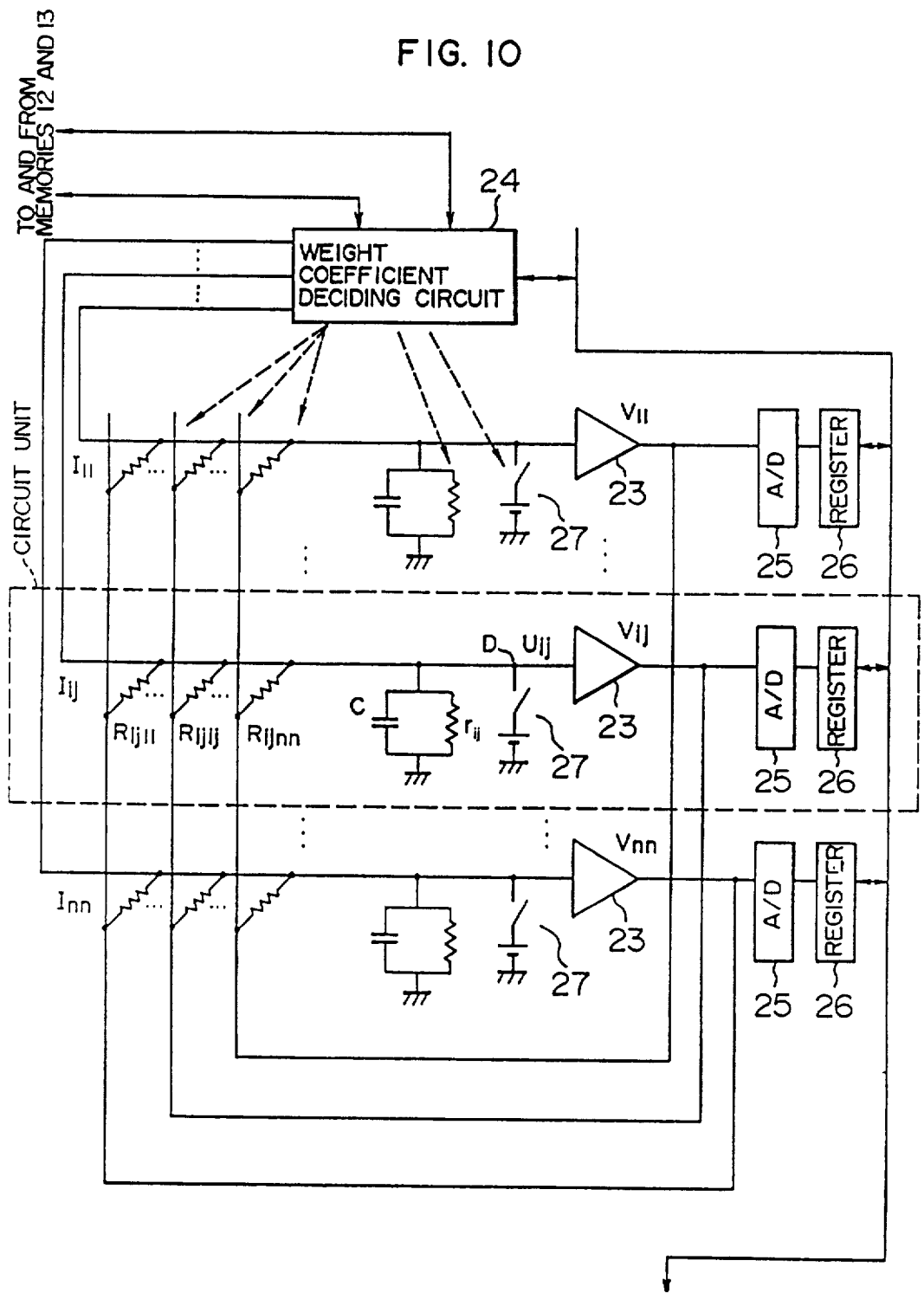
FIG. 10 is another exemplary circuit diagram embodying the iterative computation of the neural network.

FIG. 10 shows an example of a circuit for solving the equation (14), which circuit comprises a group of circuit units for computing convergence values of outputs $V_{ij}$ of $n^2$ neurons. In the drawing, a part encircled by a dotted line corresponds to one circuit unit. Explanation will be directed to the exemplary arrangement of this circuit unit. The circuit unit has an amplifier 23 for generating an output $V_{ij}$ ($=\sigma(u_{ij})$) for an input $u_{ij}$, a group of variable resistors Rijll, Rijii, Rijnn for coupling the respective neurons, a variable resistor $r_{ij}$, a capacitor C, an analog/digital (A/D) converter 25 and a register 26 for reading the value of the $V_{ij}$ by the control unit 15 (refer to FIG. 6A). Supplied to the respective circuit units is a constant current $I_{ij}$ from a weight coefficient deciding circuit 24, in addition to currents from the other circuit units. Under such conditions, when the Kirchhoff's law with respect to current is applied to a point D in the circuit unit, the following equation is satisfied.

$$I_{ij} - \sum_k \sum_l (V_{kl} - u_{ij})/R_{ijkl} = C(du_{ij}/dt) + u_{ij}/r_{ij} \quad (16)$$

The above equation (16) is modified as follows.

$$du_{ij}/dt = -(1/C)\left(1/r_{ij} - \sum_k \sum_l (1/R_{ijkl})\right)u_{ij} + \sum_k \sum_l V_{kl}/(CR_{ijkl}) + I_{ij}/C \quad (17)$$

Substituting the equation (15) into the equation (14) yields the following equation (18).

$$du_{ij}/dt = -u_{ij}/\tau - \sum_k \sum_l w_{ijkl} V_{kl} + v_{ij} \quad (18)$$

Hence, when $r_{ij}$, $R_{ijkl}$ and $I_{ij}$ are determined so as to satisfy the following equations, the respective circuit units of the neural network for solving the aforementioned dynamics can be embodied.

$$(1/C)\left(1/r_{ij} + \sum_k \sum_l (1/R_{ijkl})\right) = 1/\tau \text{ (constant value)} \quad (19)$$

$1/(C_{ijkl}) = w_{ijkl}$
$I_{ij}/C = v_{ij}$

The energy E ($=E_1+E_2$) in the matching of the present invention can be approximately expressed in the form of such a multiple first-order polynominal as the equation (15). This will be proved below.

Solving the equations (8) and (9) with respect to the coefficients a, b, c, A, B and C results in, $$a = \sum_i \sum_j a_{ij} V_{ij} \quad (20)$$

$b = \sum_i \sum_j b_{ij} V_{ij}$ $c = \sum_i \sum_j c_{ij} V_{ij}$ $A = \sum_i \sum_j A_{ij} V_{ij}$ $B = \sum_i \sum_j B_{ij} V_{ij}$ $C = \sum_i \sum_j C_{ij} V_{ij}$ where
$a_{ij}=(Da_1/D)X_j x_i - (Da_2/D)X_j y_i + (Da_3/D)X_j$
$b_{ij}=(Db_1/D)X_j x_i - (Db_2/D)X_j y_i + (Db_3/D)X_j$
$c_{ij}=(Dc_1/D)X_j x_i - (Dc_2/D)X_j y_i + (Dc_3/D)X_j$
$A_{ij}=(Da_1/D)Y_j x_i - (Da_2/D)Y_j y_i + (Da_3/D)Y_j$
$B_{ij}=(Db_1/D)Y_j x_i - (Db_2/D)Y_j y_i + (Db_3/D)Y_j$
$C_{ij}=(Dc_1/D)Y_j x_i - (Dc_2/D)Y_j y_i + (Dc_3/D)Y_j$ $$D = \begin{vmatrix} \sum_i x_i^2 & \sum_i x_i y_i & \sum_i x_i \\ \sum_i x_i y_i & \sum_i y_i^2 & \sum_i y_i \\ \sum_i x_i & \sum_i y_i & \sum_i 1 \end{vmatrix}$$

$$Da_1 = \begin{vmatrix} \sum_i y_i^2 & \sum_i y_i \\ \sum_i y_i & \sum_i 1 \end{vmatrix} \quad Da_2 = \begin{vmatrix} \sum_i x_i y_i & \sum_i x_i \\ \sum_i y_i & \sum_i 1 \end{vmatrix}$$

$$Da_3 = \begin{vmatrix} \sum_i x_i y_i & \sum_i x_i \\ \sum_i y_i^2 & \sum_i y_i \end{vmatrix}$$

$$Db_1 = \begin{vmatrix} \sum_i x_i y_i & \sum_i y_i \\ \sum_i x_i & \sum_i 1 \end{vmatrix} \quad Db_2 = \begin{vmatrix} \sum_i x_i^2 & \sum_i x_i \\ \sum_i x_i & \sum_i 1 \end{vmatrix}$$

$$Db_3 = \begin{vmatrix} \sum_i x_i^2 & \sum_i x_i \\ \sum_i x_i y_i & \sum_i y_i \end{vmatrix}$$

$$Dc_1 = \begin{vmatrix} \sum_i x_i y_i & \sum_i y_i^2 \\ \sum_i x_i & \sum_i y_i \end{vmatrix} \quad Dc_2 = \begin{vmatrix} \sum_i x_i^2 & \sum_i x_i y_i \\ \sum_i x_i & \sum_i y_i \end{vmatrix}$$

$$Dc_3 = \begin{vmatrix} \sum_i x_i^2 & \sum_i x_i y_i \\ \sum_i x_i y_i & \sum_i y_i^2 \end{vmatrix}$$

Substituting these equations into the first and second terms of the equation (7) yields the following equations (21).

$$\{X_j - (ax_i + by_i + c)\}^2 = \left(X_j - \sum_k \sum_l e_{klij} V_{kl}\right)^2 \quad (21)$$

-continued $$\{Y_j - (Ax_i + By_i + C)\}^2 = \left( Y_j - \sum_k \sum_l E_{kli} V_{kl} \right)^2$$

where $e_{kli} = a_{ikl} x_i + b_{kl} y_i + c_{kl}$
$E_{kli} = A_{ikl} x_i + B_{kl} y_i + C_{kl}$ Modifying the equation (21) so as not to change the feature of the equation, i.e., not to change the minimum solution gives, $$\left( X_j - \sum_k \sum_l e_{kli} V_{kl} \right)^2 = X_j^2 - 2X_j \sum_k \sum_l e_{kli} V_{kl} +$$

$$\left( \sum_k \sum_l e_{kli} V_{kl} \right)^2 \rightarrow X_j^2 + \sum_k \sum_l (e_{kli}^2 - 2X_j e_{kli}) V_{kl} +$$

$$\sum_k \sum_l \sum_p \sum_q (1 - \delta_{klpq}) e_{kli} e_{pqi} V_{kl} V_{pq}$$

$$\left( Y_j - \sum_k \sum_l E_{kli} V_{kl} \right)^2 = Y_j^2 - 2Y_j \sum_k \sum_l E_{kli} V_{kl} +$$

$$\left( \sum_k \sum_l E_{kli} V_{kl} \right)^2 \rightarrow Y_j^2 + \sum_k \sum_l (E_{kli}^2 - 2Y_j E_{kli}) V_{kl} +$$

$$\sum_k \sum_l \sum_p \sum_q (1 - \delta_{klpq}) E_{kli} E_{pqi} V_{kl} V_{pq}$$

where $\delta_{klpq} = 1: k = p$ and $l = q$
      $= 0:$ other

Substituting these equations into the equation (7) and further modifying it so as not to modify the feature of the equation results in the conversion of the equation (7) into a multiple first-order polynominal which follows.

$$E_2 = K_3 \bigg( \sum_i \sum_j \sum_k \sum_l \delta_{ijkl} X_j^2 - e_{kli}^2 - 2X_j e_{kli} \qquad (22)$$

$$\delta_{ijkl} Y_j^2 + E_{kli}^2 - 2Y_j E_{kli}) V_{kl} +$$

$$\sum_i \sum_j \sum_k \sum_l \sum_p \sum_q (1 - \delta_{klpq})$$

$$(e_{kli} e_{pqi} + E_{kli} E_{pqi}) V_{kl} V_{pq} \bigg)$$

Similarly, the equation (6) is converted into a multiple first-order polynominal which follows.

$$E_1 = K_1 \bigg( \sum_k \sum_l \sum_p \sum_q \delta_{kp} (1 - \delta_{lq}) V_{kl} V_{pq} + \qquad (23)$$

$$\sum_k \sum_l \sum_p \sum_q \delta_{lq} (1 - \delta_{kp}) V_{kl} V_{pq} \bigg) +$$

$$K_2 \bigg( (1/n^2) \sum_k \sum_l \sum_p \sum_q (1 - \delta_{klpq}) V_{kl} V_{pq} -$$

$$(1/n^2 - 2m/n) \sum_k \sum_l V_{kl} + m^2 \bigg)$$

-continued where $\delta_{kp} = 1: k = p$
      $= 0:$ other

Accordingly, adding the equations (22) and (23) gives such an overall energy E that follows can be obtained.

$$E = (1/2) \sum_k \sum_l \sum_p \sum_q a_{klpq} V_{kl} V_{pq} + \sum_k \sum_l \beta_{kl} V_{kl} + \gamma \qquad (24)$$

where $$a_{klpq} = 2K_1 \{\delta_{kp}(1 - \delta_{lq}) + \delta_{lq}(1 - \delta_{kp})\} + \qquad (25)$$
$$2K_2 \{(2/n^2)(1 - \delta_{klpq})\} +$$
$$2K_3 \{(1 - \delta_{klpq}) + \sum_i \sum_j (e_{kli} e_{pqi} + E_{kli} E_{pqi})\}$$

$$\beta_{kl} = K_2 \{(1/n^2) - 2m/n\} +$$

$$K_3 \bigg( \sum_i \sum_j (\delta_{ijkl} X_j^2 + e_{kli}^2 - 2X_j e_{kli} \times$$

$$\delta_{ijkl} Y_j^2 - E_{kli}^2 - 2Y_j E_{kli}) \bigg)$$

$$\gamma = K_2 m^2$$

In the case where $\gamma$ is a positive constant and a solution providing the minimum energy E is found, this is not affected and thus can be omitted. Further, the coefficient $\alpha_{klpq}$ in the equation (24) satisfies the $w_{ijkl}$ condition of the equation (15), since $\alpha_{klkl} = 0$ and $\alpha_{klpq} = \alpha_{pqkl}$. In addition, the third term of the equation (15) can be omitted for the large value of the $\tau$. Accordingly the equation (24) can be changed to exactly the same multiple first order polynomial as the equation (15). That is, when the respective resistor values and current values in FIG. 10 are determined so as to satisfy the following equations, there can be realized an analog neural network which is suitable for the matching of the present invention.

$$(1/C) \bigg( 1/r_{ij} + \sum_k \sum_l (1/R_{ijkl}) \bigg) = 1/\tau \qquad (26)$$

Figure 9:
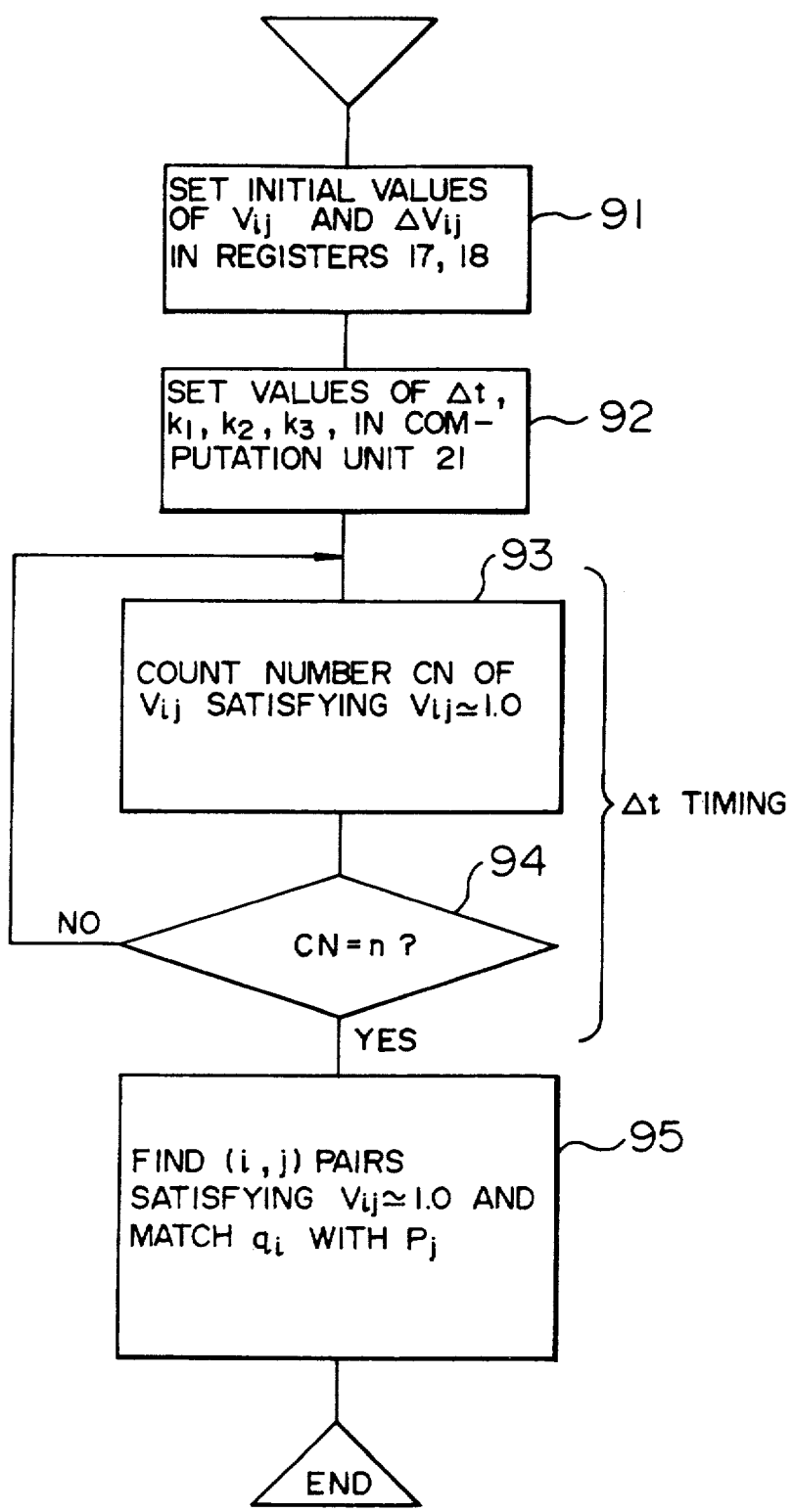
FIG. 9 is a flowchart for explaining the processing of a CPU in FIG. 6A.

($\tau$: large constant value)
$1/(CR_{ijkl}) = \alpha_{ijkl}$
$I_{ij}/C = \beta_{ij}$ The coefficients $\alpha_{ijkl}$ and $\beta_{ij}$ are expressed by functions with respect to the model characteristic point coordinates and the input characteristic point coordinates, as will be seen from the equation (25). Hence, it is necessary to modify the respective resistor values and current values expressed by these coefficients with respect to different input characteristic point coordinates. To this end, such a weight coefficient deciding circuit 24 as shown in FIG. 10 is provided, according to the equations (25) and (26), to decide the respective resistor and current values corresponding to different model and input characteristic point coordinates and these values are set in the respective circuit units. Further provided in FIG. 9 are power sources and switch circuits 27 which are used to set the initial potentials of the $u_{ij}$ in the respective circuit units. These initial potentials are set also by the weight coefficient deciding circuit 24. In this way, the matching unit 6 using the analog neural network 14 can be positively embodied. It may be also possible that the iterative computation to change the initial potential of the $u_{ij}$ for each circuit unit is carried out several times and such a solution providing the minimum one of the values $E_2$ (equation (22) at convergence may be employed as a correct matching.

Figure 12:
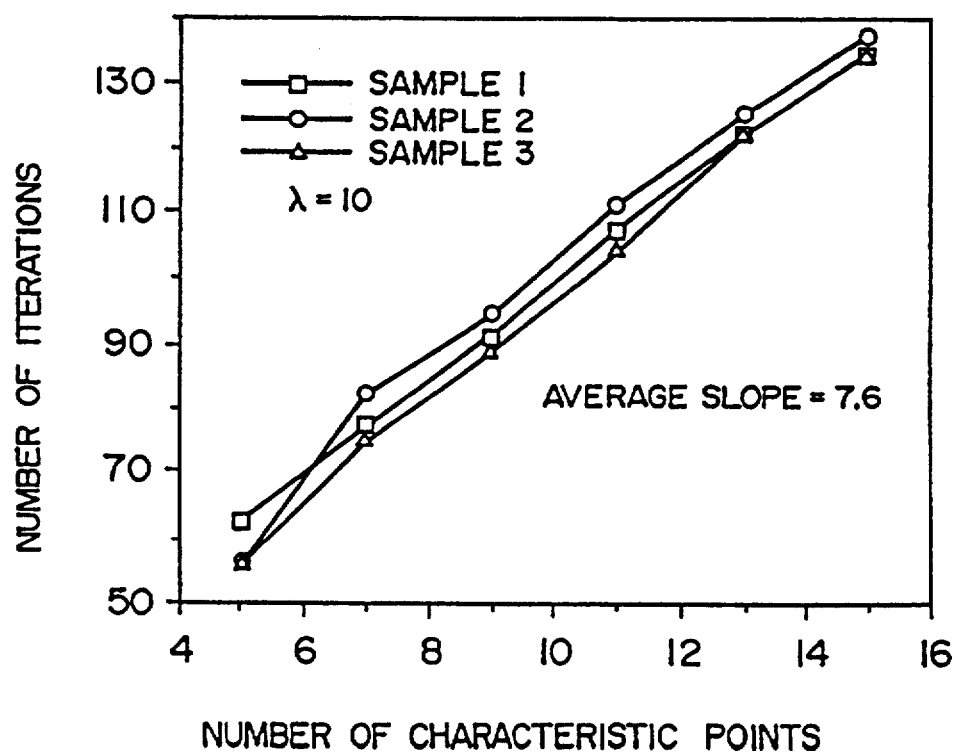
FIG. 12 is a graph showing relationships between the number n of characteristic points and the number of iterations necessary for matching.
Figure 11A:
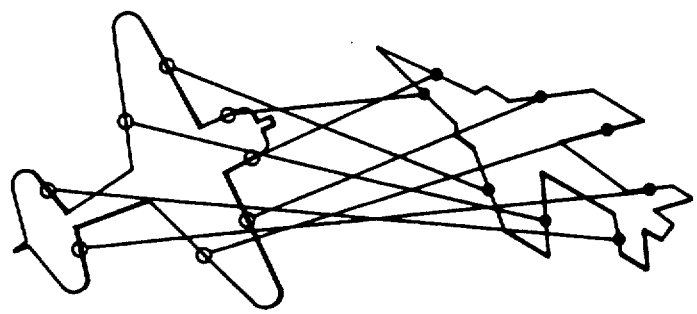
FIGS. 11A to 11C are examples of matched results between characteristic points.
Figure 11B:
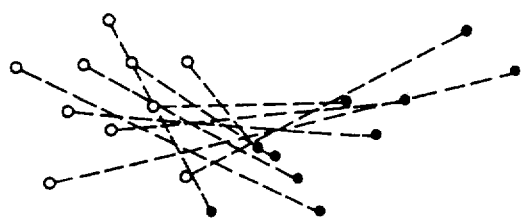
Figure 11C:
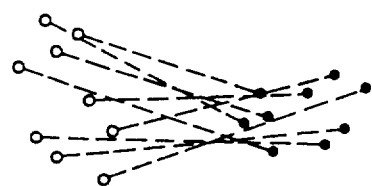

FIGS. 11A to 11C are examples of matching results between characteristic points when matching is carried out by the aforementioned matching unit 6. In the respective examples, model characteristic points (○) on the left side are optimumly matched with input characteristic points ( ) on the right side in a least squares sense. More particularly, FIG. 11A is an example wherein a toy airplane as a plastic model is matched with its image picture, FIG. 11B is an example wherein a mark " " (star)model is matched with its image picture, and FIG. 11C is an example wherein a Japanese letter " " model is matched with its image picture. FIG. 12 shows a relationship between the number n of characteristic points and the number of iterations (the number of t updating times) necessary for matching when the neural network of FIG. 8 is used. Since the test result of FIG. 12 shows the number of iterations proportional to the number n of characteristic points, the processing speed of the present invention can be expected to be made much more increased than that of the prior art requiring the processing time proportional to n!.

The foregoing explanation has been made in the connection with the case where a group of input characteristic points are subjected to most common linear transformation, e.g., affine transformation and minute variation with respect to a group of model characteristic points. However, even in the case of such transformation that provides constant relationships between the coefficients a, b, c, A, B and C in the equation (7), for example, in the case of transformation keeping an orthogonal state even after the transformation or nonlinear transformation with respect to $x_i$ and $y_i$, it can be solved in the same manner as the present invention. In the former case (transformation keeping an orthogonal state), for example, the energy $E_2$ is defined as follows.

$$E_2 = K_3 \sum_i \sum_j V_{ij}^2 [\{X_j - (ax_i + by_i + c)\}^2 + \{Y_j - (bx_i + ay_i + C)\}^2] \quad (27)$$

In this case, the transformation coefficients a, b, c and C satisfies the following matrix equation (28).

$$\begin{pmatrix} \sum_i x_i^2 + y_i^2, & 0, & \sum_i x_i, & \sum_i y_i \\ 0, & \sum_i x_i^2 + y_i^2, & \sum_i y_i, & -\sum_i x_i \\ \sum_i x_i, & \sum_i y_i, & n, & 0 \\ \sum_i y_i, & -\sum_i x_i, & 0, & n \end{pmatrix} \begin{pmatrix} a \\ b \\ c \\ C \end{pmatrix} = \begin{pmatrix} \sum_i \sum_j V_{ij}(X_j x_i + Y_j y_i) \\ \sum_i \sum_j V_{ij}(X_j y_i + Y_j x_i) \\ \sum_i \sum_j V_{ij} X_j \\ \sum_i \sum_j V_{ij} Y_j \end{pmatrix} \quad (28)$$

The matrix equation becomes to the solution based on the least square method of combinations of the $V_{ij}$ when the $V_{ij}$ is converged to 1 or 0. Even in the latter case of the nonlinear transformation, the energy $E_2$ is defined as follows, $$E_2 = K_3 \sum_i \sum_j V_{ij}^2 [\{X_j - f(x_i, y_i, a, b, c)\}^2 + \{Y_j - F(x_i, y_i, A, B, C)\}^2] \quad (29)$$

where the nonlinear transformation functions f ($x_i$, $y_i$, a, b, c) and F ($x_i$, $y_i$, A, B, C) are linear functions with respect to the coefficients a, b, c, A, B and C. In this case, equations corresponding to the equation (8) and (9) can be made based on the least squares method.

Though the present embodiments have been described in connection with the matching between characteristic points in the two-dimensional coordinate system, the present invention may be readily expanded to the case of matching between characteristic points in an K-dimensional coordinate system (K: integer of 3 or more) other than the two-dimensional coordinate system. In the latter case, the energy $E_2$ is defined as follows.

$$E_2 = K_3 \sum_i \sum_j V_{ij}^n \sum_p \left( X_{jp} - \sum_q (a_{pq}, x_{iq}) - c_p \right)^2 \quad (30)$$

where $K_3$ is a linear weight coefficient which is an integer (of preferably 1 or 2), $(X_{j1}, X_{j2}, X_{j3}, \ldots, X_{jk})$ and $(x_{i1}, x_{i2}, x_{i3}, \ldots, x_{ik})$ mean input and model characteristic point coordinates respectively, and all, $a_{12}, a_{13}, \ldots, a_{kk}$ and $c_1, c_2, c_3, \ldots, c_k$ denote affine transformation coefficients. Also "q" of "$x_{iq}$" represents a coordinate axis component of a point "$x_i$" before being subjected to an affine transformation. That is "$x_{iq}$" represents a q-th coordinate axis component of an i-th point. Additionally, "$a_{pq}$" represents an affine transformation coefficient corresponding to "$x_{iq}$". Further, the transformation coefficients satisfy the following matrix equation (31).

$$\begin{pmatrix} \sum_i x_{i1}^2, & \sum_i x_{i1}x_{i2}, & \sum_i x_{i1}x_{i3}, & \ldots, & \sum_i x_{i1}x_{ik}, & \sum_i x_{i1} \\ \sum_i x_{i2}x_{i1}, & \sum_i x_{i2}^2, & \sum_i x_{i2}x_{i3}, & \ldots, & \sum_i x_{i2}x_{ik}, & \sum_i x_{i2} \\ \sum_i x_{i3}x_{i1}, & \sum_i x_{i3}x_{i2}, & \sum_i x_{i3}^2, & \ldots, & \sum_i x_{i3}x_{ik}, & \sum_i x_{i3} \\ \vdots & & & & & \\ \sum_i x_{ik}x_{i1}, & \sum_i x_{ik}x_{i2}, & \sum_i x_{ik}x_{i3}, & \ldots, & \sum_i x_{ik}^2, & \sum_i x_{ik} \\ \sum_i x_{i1}, & \sum_i x_{i2}, & \sum_i x_{i3}, & \ldots, & \sum_i x_{ik}, & \sum_i 1 \end{pmatrix} \quad (31)$$

$$\begin{pmatrix} a_{p1} \\ a_{p2} \\ a_{p3} \\ \vdots \\ a_{pk} \\ c_p \end{pmatrix} = \begin{pmatrix} \sum_i \sum_j V_{ij} X_{jp} x_{i1} \\ \sum_i \sum_j V_{ij} X_{jp} x_{i2} \\ \sum_i \sum_j V_{ij} X_{jp} x_{i3} \\ \vdots \\ \sum_i \sum_j V_{ij} X_{jp} x_{ik} \\ \sum_i \sum_j V_{ij} X_{jp} \end{pmatrix}$$

In the above matrix equation, since parameter p takes a value between 1 and k, the above equation corresponds to K equations. When K=2, as a matter of course, the matrix equation (31) corresponds to the equations (8)

and (9) in the two dimensional case by changing $x_i$, $y_i$, $X_j$, $Y_j$, $a_{11}$, $a_{12}$, $c_1$, $a_{21}$, $a_{22}$ and $c_2$ to $x_{i1}$, $x_{i2}$, $X_{j1}$, $X_{j2}$, a, b, c, A, B and C, respectively.

The foregoing embodiment has been described in conjunction with the case where the number n of model characteristic points is equal to the number n of input characteristic points. However, in the case where the number of model characteristic points is not equal to the number of input characteristic points, for example, when the number N of input characteristic points is not equal to the number n of the model characteristic points, the upper limit of Σ with respect to j in the present embodiment may be changed from n to N.

Although image picture pattern matching has been described in the foregoing embodiments, the present invention may be generally applied to optimum matching between a plurality of data of two groups indicative of physical quantities.

We claim:

1. A point pattern matching method for deciding pair combinations between a first group of n points $\overline{X}_j$ (where n is an integer of 2 or more) (J: integer between 1 and n) in a K-dimensional space (K: integer of 2 or more), and a second group of n second points $\overline{x}_i$ (i: integer between 1 and n) in the same space as the K-dimensional space, the method comprising the steps of:
   providing a single neuron for each one of point pair combinations between said first group of points and said second group of points to make a total of $n^2$ neurons so that each neuron outputs a degree of correspondence between an associated point pair combination;
   determining that, when an output of each of said neurons has a value of substantially "1", the point pair combination associated with the neuron is matched, whereas, when the output of the neuron has a value of substantially "0", the point pair combination associated with the neuron is not matched;
   connecting said neurons to each other in a neural network, in a manner that each neuron inputs data associated with the output values of the other neurons;
   operating the neural network to provide a minimum overall energy of the neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation.

2. A point pattern matching method as set forth in claim 1, wherein said neurons form a Hopfield-type neural network.

3. A point pattern matching method as set forth in claim 1, wherein said determining step includes a step of preparing a first threshold value substantially close to 1 and a second threshold value substantially close to 0, a step of obtaining output values of said neurons indicative of matching degrees in point pair combinations, a step of determining that, when the output value of the neuron exceeds said first threshold value, the point pair combination associated with the neuron is matched, and a step determining that, when the output value of the neuron does not exceed said second threshold value, the point pair combination associated with the neuron is not matched.

4. A point pattern matching method for deciding pair combinations between a first group of n points $\overline{X}_j$ (n: integer of 2 or more) (j: integer between 1 and n) in a K-dimensional space (K: integer of 2 or more) and a second group of n second points $\overline{x}_i$ (i: integer between 1 and n) in the same space as the K-dimensional space, the method comprising the steps of:
   providing a single neuron to each one of point pair combinations between said first group of points and said second group of points to make a total of $n^2$ neurons so that each neuron outputs a degree of correspondence between an associated point pair combination, the neurons connected to each other in a neural network, in a manner that each neuron inputs data associated with the output values of the other neurons;
   determining that when an output of each of the neurons has a value of substantially "1", the point pair combination associated with the neuron is matched and, when the output of the neuron has a value of substantially "0", the point pair combination associated with the neuron is not matched; and
   operating the neural network to provide a minimum overall energy of the neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation.

5. A point pattern matching method as set forth in claim 4, wherein said second energy is a cost energy which is defined as said first group of points subjected to a linear transformation with respect to said second points.

6. A point pattern matching method as set forth in claim 5, wherein, when coordinates of said first group of points $\overline{X}_j$ and coordinates of said second group of points $\overline{x}_i$ are expressed respectively as $(X_{j1}, X_{j2}, X_{j3}, \ldots, X_{jk})$ and $(x_{i1}, x_{i2}, x_{i3}, \ldots, x_{ik})$, said second energy $E_2$ is given as, $$E_2 = \sum_i \sum_j V_{ij}^{n'} \sum_p \left( X_{jp} - \sum_q (a_{pq} \cdot x_{iq}) - c_p \right)^2.$$

where V is an output of a neuron, where n' is an integer, where q of $x_{iq}$ represents a coordinate axis component of a point $x_i$ before being subjected to an affine transformation, such that $x_{iq}$ represents a q-th coordinate axis component of an i-th point and where $a_{pq}$ represents an affine transformation coefficient corresponding to $x_{iq}$, and where affine transformation coefficients $a_{11}$, $a_{12}$, $a_{13}$, ..., $a_{kk}$ and $c_1$, $c_2$, $c_3$, ..., $c_k$ satisfy the following K equations (p: integer between 1 and K), $$\begin{pmatrix} \sum_i x_{i1}^2 & \sum_i x_{i1}x_{i2} & \sum_i x_{i1}x_{i3} & \ldots & \sum_i x_{i1}x_{ik} & \sum_i x_{i1} \\ \sum_i x_{i2}x_{i1} & \sum_i x_{i2}^2 & \sum_i x_{i2}x_{i3} & \ldots & \sum_i x_{i2}x_{ik} & \sum_i x_{i2} \\ \sum_i x_{i3}x_{i1} & \sum_i x_{i3}x_{i2} & \sum_i x_{i3}^2 & \ldots & \sum_i x_{i3}x_{ik} & \sum_i x_{i3} \end{pmatrix}$$

-continued $$\begin{pmatrix} \sum_i x_{ik}x_{i1}, & \sum_i x_{ik}x_{i2}, & \sum_i x_{ik}x_{i3}, & \ldots, & \sum_i x_{ik}^2, & \sum_i x_{ik} \\ \sum_i x_{i1}, & \sum_i x_{i2}, & \sum_i x_{i3}, & \ldots, & \sum_i x_{ik}, & \sum_i 1 \end{pmatrix}$$

$$\begin{pmatrix} a_{p1} \\ a_{p2} \\ a_{p3} \\ \vdots \\ a_{pk} \\ c_p \end{pmatrix} = \begin{pmatrix} \sum_i \sum_j V_{ij} X_{jp} x_{i1} \\ \sum_i \sum_j V_{ij} X_{jp} x_{i2} \\ \sum_i \sum_j V_{ij} X_{jp} x_{i3} \\ \vdots \\ \sum_i \sum_j V_{ij} X_{jp} x_{ik} \\ \sum_i \sum_j V_{ij} X_{jp} \end{pmatrix}$$

7. A point pattern matching method as set forth in claim 4, wherein said second energy is defined as said first group of points subjected to a transformation which maintains an orthogonal state of said first group of points with respect to said second group of points after said transformation.

8. A point pattern matching method as set forth in claim 4, wherein said second energy is defined as said first group of points subjected to a nonlinear transformation with respect to said second group of points.

9. A point pattern matching method for deciding pair combinations between a first group of n points $\overline{X}_j$ (n: integer of 2 or more) (j: integer between 1 and n) in a two-dimensional space and a second group of n second points $\overline{x}_i$ (i: integer between 1 and n) in the same space as the two-dimensional space, the method comprising the steps of:

providing a single neuron to each one of point pair combinations between said first group of points and said second group of points to make a total of n² neurons;

determining that, when an output of each of said neurons has a value of substantially "1", the point pair combination associated with the neuron is matched, whereas, when the output of the neuron has a value of substantially "0", the point pair combination associated with the neuron is not matched;

connecting said neurons to each other in a neural network in a manner that each neuron inputs data associated with the output values of the other neurons; and operating the neural network to provide a minimum overall energy of the neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation.

10. A point pattern matching method as set forth in claim 9, wherein said neurons form a Hopfield-type neural network.

11. A point pattern matching method as set forth in claim 10, wherein said second energy is a cost energy which is defined as said first group of points subjected to a linear transformation with respect to said second group of points, and, when coordinates of the first group of points $\overline{x}_j$ and coordinates of the second group of points $\overline{X}_i$ are expressed respectively as $(X_j, Y_j)$ and $(x_i, y_i)$ said cost energy $E_2$ is given as:

$$E_2 = \sum_i \sum_j V_{ij}^{n'} [\{X_j - (ax_i + by_i + c)\}^2 + \{Y_j - (Ax_i + By_i + C)\}^2],$$

where V is an output of a neuron, where n' is an integer, and transformation coefficients a, b, c, A, B and C satisfy, $$\begin{bmatrix} \sum_i x_i^2, & \sum_i x_i y_i, & \sum_i x_i \\ \sum_i y_i x_i, & \sum_i y_i^2, & \sum_i y_i \\ \sum_i x_i, & \sum_i y_i, & \sum_i 1 \end{bmatrix} \begin{bmatrix} a \\ b \\ c \end{bmatrix} = \begin{bmatrix} \sum_i \sum_j V_{ij} X_j x_i \\ \sum_i \sum_j V_{ij} X_j y_i \\ \sum_i \sum_j V_{ij} X_j \end{bmatrix}$$

$$\begin{bmatrix} \sum_i x_i^2, & \sum_i x_i y_i, & \sum_i x_i \\ \sum_i y_i x_i, & \sum_i y_i^2, & \sum_i y_i \\ \sum_i x_i, & \sum_i y_i, & \sum_i 1 \end{bmatrix} \begin{bmatrix} A \\ B \\ C \end{bmatrix} = \begin{bmatrix} \sum_i \sum_j V_{ij} Y_j x_i \\ \sum_i \sum_j V_{ij} Y_j y_i \\ \sum_i \sum_j V_{ij} Y_j \end{bmatrix}$$

12. A point pattern matching system for deciding pair combinations between a first group of n points $\overline{X}_j$ (n: integer of 2 or more) (j: integer between 1 and n) in a K-dimensional space (K: integer of 2 or more) and a second group of n second points $\overline{x}_i$ (i: integer between 1 and n) in the same space as the K-dimensional space, said system comprising:

a neural network having a total of n² neurons each provided for each one of point pair combinations between said first group of points and said second group of points, said neurons connected to each other in a manner that each neuron inputs data associated with the output values of the other neurons;

means for determining that, when an output of each of said neurons has a value of substantially "1", the point pair combination associated with the neuron is matched, whereas, when the output of the neuron has a value of substantially "0", the point pair combination associated with the neuron is not matched; and adjusting means for operating the neural network to provide a minimum overall energy of said neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation.

13. A point pattern matching method as set forth in claim 12, wherein said neurons form a Hopfield-type neural network.

14. A point pattern matching method for deciding pair combinations between a first group of n points $X_j$ (n: integer of 2 or more) (j: integer between 1 and n) in a two-dimensional space and a second group of n second points $x_i$ (i: integer between 1 and n) in the same space as the two-dimensional space, the method comprising the steps of:

providing a single neuron to each one of point pair combinations between said first group of points and said second group of points for a total of $n^2$ neurons;

determining that, when an output of each of said neurons has a value of substantially "1", the point pair combination associated with the neuron is matched and, when the output of the neuron has a value of substantially "0", the point pair combination associated with the neuron is not matched; and connecting said neurons in a Hopfield-type neural network in a manner that each neuron inputs data associated with the output values of the other neurons to provide a minimum of overall energy of the neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points all in 1:1 relation.

15. A point pattern matching method as set forth in claim 14, wherein said second energy is a cost energy which is defined as said first group of points subjected to a linear transformation with respect to said second group of points, and, when coordinates of the first group of points $\overline{X}_j$ and coordinates of the second group of points $\overline{x}_i$ are expressed respectively as $(X_{j1}, X_{j2}, X_{j3}, \ldots, X_{jk})$ and $(x_{i1}, x_{i2}, x_{i3}, \ldots, x_{ik})$, said second energy $E_2$ is given as, $$E_2 = \sum_i \sum_j V_{ij}^{n'} \sum_p \left( X_{jp} - \sum_q (a_{pq} \cdot x_{iq}) - c_p \right)^2.$$

where V is an output of a neuron, where n' is an integer, where q of $x_{iq}$ represents a coordinate axis component of a point $x_i$ before being subjected to an affine transformation, such that $x_{iq}$ represents a q-th coordinate axis component of an i-th point and where $a_{pq}$ represents an affine transformation coefficient corresponding to $x_{iq}$, and affine transformation coefficients $a_{11}, a_{12}, a_{13}, \ldots, a_{kk}$ and $c_1, c_2, c_3, \ldots, c_k$ satisfy the following K equations (p: integer between 1 and K), $$\begin{pmatrix} \sum_i x_{i1}^2, & \sum_i x_{i1}x_{i2}, & \sum_i x_{i1}x_{i3}, & \ldots, & \sum_i x_{i1}x_{ik}, & \sum_i x_{i1} \\ \sum_i x_{i2}x_{i1}, & \sum_i x_{i2}^2, & \sum_i x_{i2}x_{i3}, & \ldots, & \sum_i x_{i2}x_{ik}, & \sum_i x_{i2} \\ \sum_i x_{i3}x_{i1}, & \sum_i x_{i3}x_{i2}, & \sum_i x_{i3}^2, & \ldots, & \sum_i x_{i3}x_{ik}, & \sum_i x_{i3} \\ & & \vdots & & & \\ \sum_i x_{ik}x_{i1}, & \sum_i x_{ik}x_{i2}, & \sum_i x_{ik}x_{i3}, & \ldots, & \sum_i x_{ik}^2, & \sum_i x_{ik} \\ \sum_i x_{i1}, & \sum_i x_{i2}, & \sum_i x_{i3}, & \ldots, & \sum_i x_{ik}, & \sum_i 1 \end{pmatrix}$$

$$\begin{pmatrix} a_{p1} \\ a_{p2} \\ a_{p3} \\ \vdots \\ a_{pk} \\ c_p \end{pmatrix} = \begin{pmatrix} \sum_i \sum_j V_{ij} X_{jp} x_{i1} \\ \sum_i \sum_j V_{ij} X_{jp} x_{i2} \\ \sum_i \sum_j V_{ij} X_{jp} x_{i3} \\ \vdots \\ \sum_i \sum_j V_{ij} X_{jp} x_{ik} \\ \sum_i \sum_j V_{ij} X_{jp} \end{pmatrix}$$

16. An object recognizing method for recognizing a site of an object in an image picture through picture processing, the method comprising the steps of:

extracting a first group of characteristic points $\overline{x}_i$ (i: integer between 1 and n) from said object in said picture;

storing in memory means a second group of characteristic points $\overline{X}_j$ (j: integer between 1 and n) of a model corresponding to the object and attribute data for said second group of characteristic points;

providing a neural network having a plurality of neurons each provided for each one of point pair combinations between the first group of characteristic points and the second group of characteristic points and the neurons connected to each other in a manner that each neuron inputs data associated with the output values of the other neurons;

operating the neural network to provide a minimum overall energy of said neurons, said overall energy being a linear coupling between a first energy defined as having its minimum value when said first group of points are matched with said second group of points al in 1:1 relation and a second energy defined as providing a minimum of a matching error in a least squares sense when the first group of points are matched with the second group of points in a 1:1 relation;

reading out an output value of each neuron and determining that, when the output value of the neuron is substantially "1", the point pair combination associated with the neuron is matched, and reading out from said memory means one of said attribute data of the second group of characteristic points corresponding to said point pair combination determined to be matched in said determining step.

17. A point pattern matching method as set forth in claim 16, wherein said neural network comprises a Hopfield-type neural network.

18. A point pattern matching method as set forth in claim 17, wherein said second group of characteristic points correspond to a group of n points (n: integer of 2 or more) in a K-dimensional space (K: integer of 2 or more) and said first group of characteristic points correspond to a group of n points in the same space as the K-dimensional space, and wherein, when coordinates of the second group of points $\overline{X}_j$ and coordinates of the first group of points $\overline{x}_i$ are expressed respectively as $(X_{j1}, X_{j2}, X_{j3}, \ldots, X_{jk})$ and $(x_{i1}, x_{i2}, x_{i3}, \ldots, x_{ik})$, said second energy $E_2$ is given as, $$E_2 = \sum_i \sum_j V_{ij}^{n'} \sum_p \left( X_{jp} - \sum_q (a_{pq} \cdot x_{iq}) - c_p \right)^2,$$

where V is an output of a neuron, where n' is an integer, where q of $x_{iq}$ represents a coordinate axis component of a point $x_i$ before being subjected to an affine transformation, such that $x_{iq}$ represents a q-th coordinate axis component of an i-th point and where $a_{pq}$ represents an affine transformation coefficient corresponding to $x_{iq}$, and affine transformation coefficients $a_{11}, a_{12}, a_{13}, \ldots, a_{kk}$ and $c_1, c_2, c_3, \ldots, c_k$ satisfy the following K equations (p: integer between 1 and K), $$\begin{pmatrix} \sum_i x_{i1}^2, & \sum_i x_{i1}x_{i2}, & \sum_i x_{i1}x_{i3}, & \ldots, & \sum_i x_{i1}x_{ik}, & \sum_i x_{i1} \\ \sum_i x_{i2}x_{i1}, & \sum_i x_{i2}^2, & \sum_i x_{i2}x_{i3}, & \ldots, & \sum_i x_{i2}x_{ik}, & \sum_i x_{i2} \\ \sum_i x_{i3}x_{i1}, & \sum_i x_{i3}x_{i2}, & \sum_i x_{i3}^2, & \ldots, & \sum_i x_{i3}x_{ik}, & \sum_i x_{i3} \\ \vdots & & & & & \\ \sum_i x_{ik}x_{i1}, & \sum_i x_{ik}x_{i2}, & \sum_i x_{ik}x_{i3}, & \ldots, & \sum_i x_{ik}^2, & \sum_i x_{ik} \\ \sum_i x_{i1}, & \sum_i x_{i2}, & \sum_i x_{i3}, & \ldots, & \sum_i x_{ik}, & \sum_i 1 \end{pmatrix}$$

$$\begin{pmatrix} a_{p1} \\ a_{p2} \\ a_{p3} \\ \vdots \\ a_{pk} \\ c_p \end{pmatrix} = \begin{pmatrix} \sum_i \sum_j V_{ij} X_{jp} x_{i1} \\ \sum_i \sum_j V_{ij} X_{jp} x_{i2} \\ \sum_i \sum_j V_{ij} X_{jp} x_{i3} \\ \vdots \\ \sum_i \sum_j V_{ij} X_{jp} x_{ik} \\ \sum_i \sum_j V_{ij} X_{jp} \end{pmatrix}$$

19. An object recognizing system for recognizing a site of an object in an image picture through picture processing, said system comprising:

first means for extracting a first group of characteristic points $\bar{x}_i$ (i: integer between 1 and n) from said object in said picture;

second means for storing a second group of characteristic points $\bar{X}_j$ (j: integer between 1 and n) of a model corresponding to the object and attribute data for said second group of characteristic points;

a neural network having a plurality of neurons connected to each other in a manner that each neuron inputs data associated with the output values of the other neurons, the plurality of neurons each provided for each one of point pair combinations between the first group of characteristic points and the second group of characteristic points;

operating means for operating the neural network to provide a minimum overall energy of said neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation;

third means for reading out an output value of each neuron and determining that, when the output value of the neuron is substantially "1", the point pair combination associated with the neuron is matched; and fourth means for reading out from said second means one of said attribute data of the second group of characteristic points corresponding to said point pair combination determined as matched by said third means.

20. A point pattern matching method for deciding pair combinations between a first group of feature points in a two-dimensional space and a second group of feature points in the same two-dimensional space, the method comprising the steps of:

providing a single neuron to each one of point pair combinations between said first group of feature points and said second group of feature points for a total of $n^2$ neurons (where n is an integer of 2 or more);

connecting said neurons to each other in a neural network in a manner that each neuron inputs data associated with the output values of the other neurons;

operating the neural network based on neurodynamics utilizing energy functions to provide a minimum overall energy of the neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation; and, determining that when the minimum overall energy of the neurons is achieved, optimal matching between the first group of feature points and the second group of feature points is achieved.

21. A point pattern matching method for deciding pair combinations between a first group of feature points in a two-dimensional space and a second group of feature points in the same space as the two-dimensional space, the method comprising the steps of:

providing a single neuron to each one of point pair combinations between said first group of points and said second group of points to make a total of $n^2$ neurons (where n is an integer of 2 or more);

connecting said neurons to each other in a neural network in a manner that each neuron inputs data associated with the output values of the other neurons;

operating the neural network based on weighting coefficients defined by coordinate values of the feature points to provide a minimum overall energy of the neurons, said overall energy being a linear coupling between a first energy defined as having its minimum value when said first group of points are matched with said second group of points all in 1:1 relation and a second energy defined as providing a minimum of a matching error in a least squares sense when the first group of points are matched with the second group of points in a 1:1 relation; and determining that when the minimum overall energy of the neurons is achieved, optimal matching between the first group of feature points and the second group of feature points is achieved.

* * * * *

UNITED STATES PATENT AND TRADEMARK OFFICE
CERTIFICATE OF CORRECTION

PATENT NO. :   5,259,038
DATED      :   November 2, 1993
INVENTOR(S) :  Hiroshi Sakou, et al.

It is certified that error appears in the above-identified patent and that said Letters Patent is hereby corrected as shown below:

Title Page:

[73] Assignee: Hitachi, Ltd., Tokyo, Japan

In the Claims:

Claim 1, column 19, line 22, delete "J" and substitute therefor --j--.

Claim 16, column 24, line 31, (or line 23 of claim 16), delete "al" and substitute therefor --all--.

Signed and Sealed this

Sixteenth Day of May, 1995

Attest:

BRUCE LEHMAN

Attesting Officer   Commissioner of Patents and Trademarks